Nov. 7, 1933.     S. E. PATCHELL ET AL     1,933,927
ELECTRICAL COOKING UTENSIL
Filed June 20, 1932
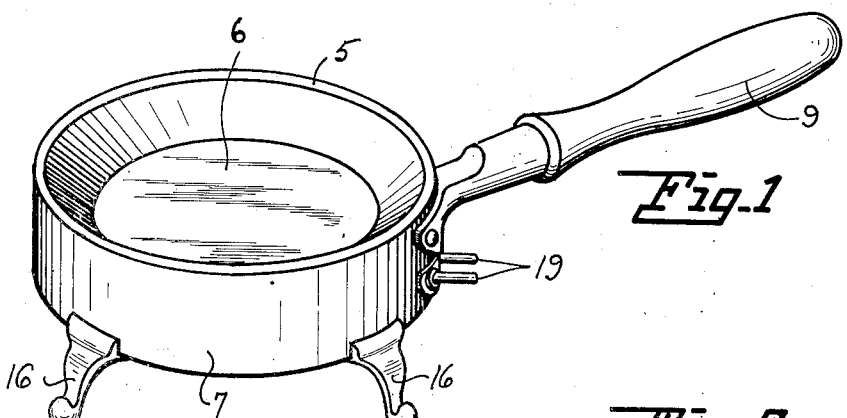
*Fig. 1*
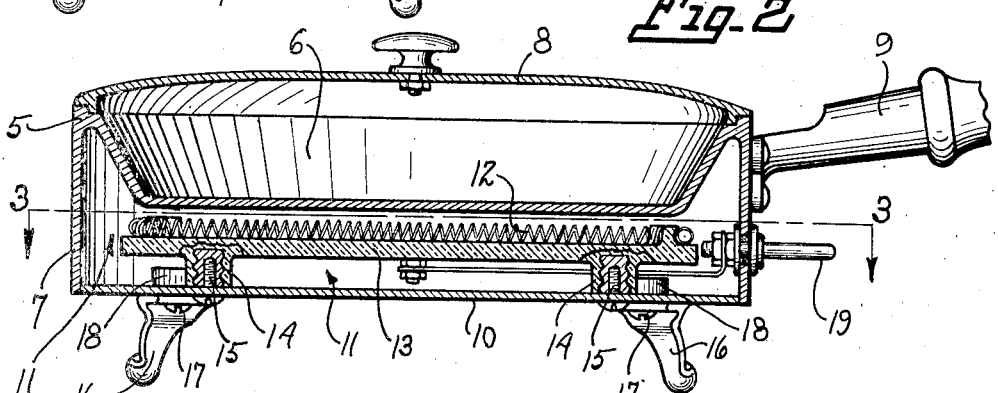
*Fig. 2*
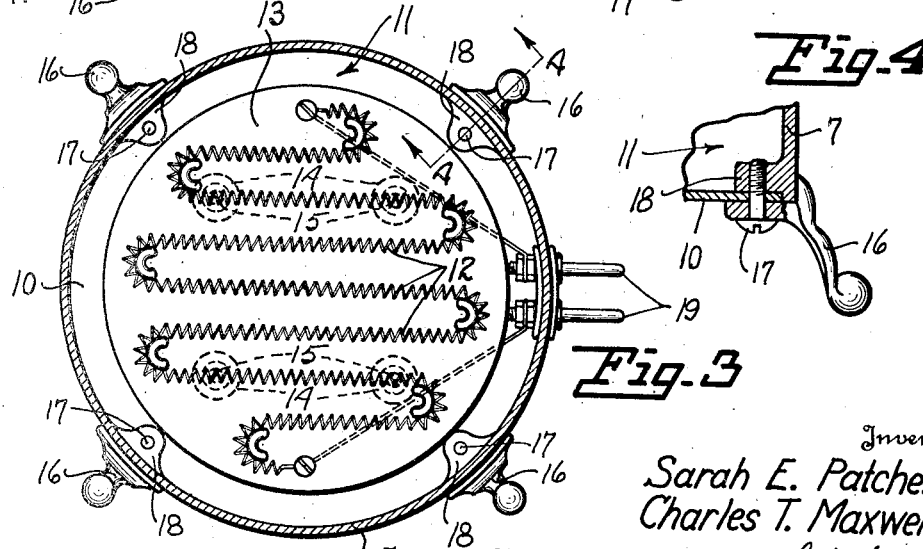
*Fig. 4*
*Fig. 3*
Inventor
Sarah E. Patchell
Charles T. Maxwell
Glenn L. Fish
Attorney Patented Nov. 7, 1933

1,933,927

UNITED STATES PATENT OFFICE 1,933,927

ELECTRICAL COOKING UTENSIL

Sarah E. Patchell and Charles T. Maxwell, Spokane, Wash.

Application June 20, 1932. Serial No. 618,168

1 Claim. (Cl. 219—44)

Our invention relates to electrical cooking utensils and the primary objects of the invention are to provide an electrical cooking utensil having a heating element completely enclosed within a compartment in its bottom portion thus retaining the heat generated by the element and greatly increasing the efficiency of the device. Further objects are to provide a bottom plate for the element containing compartment upon which the element is insulatively mounted, and to provide fastening means which serve the dual purpose of fastening the bottom plate and the legs to the main body of the device.

With the above and other objects in view which will appear as the description proceeds, the invention consists of the novel construction, adaptation, combination and arrangement of parts hereinafter described and claimed. These objects are accomplished by devices illustrated in the accompanying drawing; wherein: Figure 1 is a view in perspective of the utensil; Fig. 2 is a view in central vertical section of the same; Fig. 3 is a view in horizontal section taken substantially on a broken line 3—3 of Fig. 2; and Fig. 4 is a fragmentary detail view in vertical section taken on a broken line 4—4 of Fig. 3 and showing the fastening means for the bottom plate and legs.

Referring to the drawing throughout which like reference numerals indicate like parts, the numeral 5 designates the main body of the device which comprises a cooking receptacle portion 6 and a depending flange 7 all preferably constructed of one piece of metal. The cooking receptacle portion has a lid 8 and a handle 9. The depending flange has a bottom plate 10 secured thereto thus providing a completely closed lower compartment 11 disposed directly under and in communication with the bottom of the cooking receptacle.

Within the closed compartment 11 a heating element 12 is mounted on an insulator plate 13. A plurality of legs 14 are provided for the insulator plate and rest on the bottom plate 10 being secured thereto by screws 15. Legs 16 are secured to the bottom of the device by screws 17 passing through the bottom plate and through lugs 18 projecting from the lower edge of the depending flange 7 as most clearly shown in Fig. 4 of the drawing. Said screws thus serve the dual purpose of securing the legs and the bottom plate in place. The heating element comprises the usual resistance coils and their ends are connected to terminals 19 fixed through the depending flange whereby the device may be connected to a socket carrying the current supply wires as will be understood.

The advantages derived in completely enclosing the heating element 12 within the lower compartment 11 are that the heat from the element is prevented from rapid radiation and consequent dissipation. A maximum amount of heat is therefore directed against the cooking portion of the device thus materially increasing its efficiency and providing means whereby smaller heating elements may be used to supply the same amount of heat and thus effecting a saving in the cost of electric current and in the cost of production of the device.

Having thus described our invention, it being understood that minor changes may be resorted to in its construction and arrangement without departing from the scope and spirit of the invention, what we claim and desire to secure by Letters Patent of the United States is:—

An electrical cooking utensil comprising a cooking receptacle having a flange depending below the bottom of said cooking receptacle, a bottom plate secured to the lower edge of the flange and forming a closed compartment directly below and in communication with the bottom of the cooking receptacle, lugs projecting inwardly from the depending flange and engaging the upper surface of the bottom plate, legs supported against the lower surface of the bottom plate, screws passing through said legs, bottom plate and lugs to form means for fastening the bottom plate and the legs to said lugs, an insulator plate having legs secured to the bottom plate, and a heating element mounted on said insulator plate and having its terminals fixed through the depending flange.

SARAH E. PATCHELL.
CHARLES T. MAXWELL.